J. H. STUBBLEFIELD.
SPACING ATTACHMENT FOR CULTIVATORS OR PLOWS.
APPLICATION FILED AUG. 26, 1911.
1,025,546.
Patented May 7, 1912.
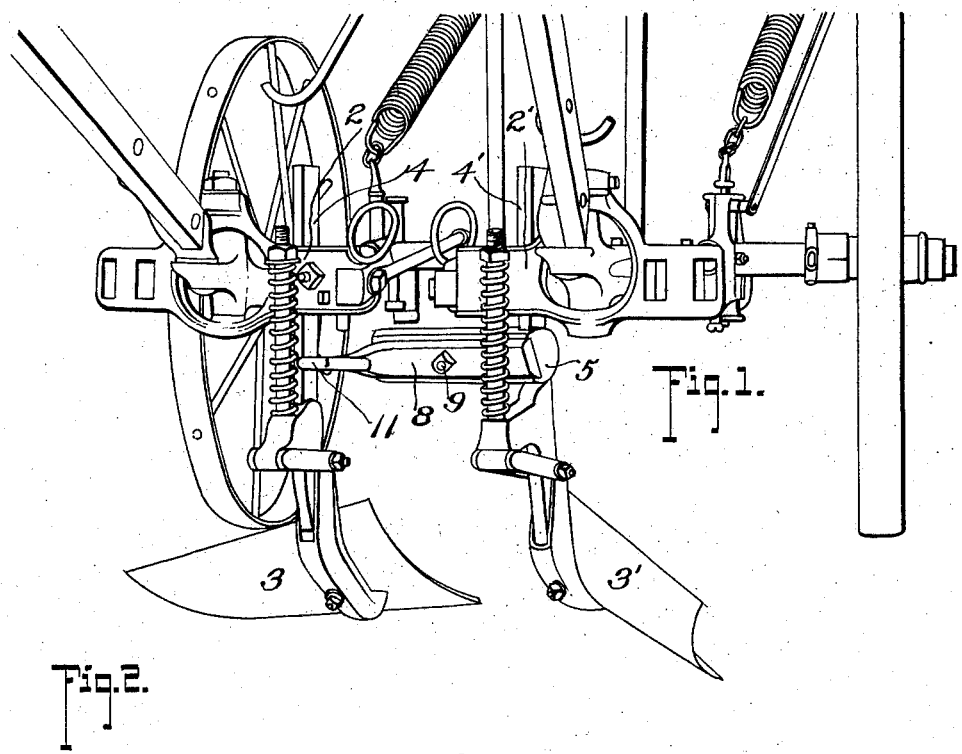
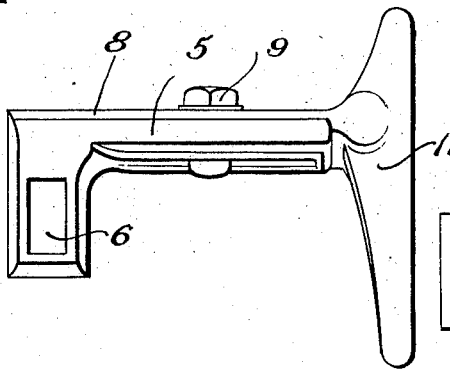
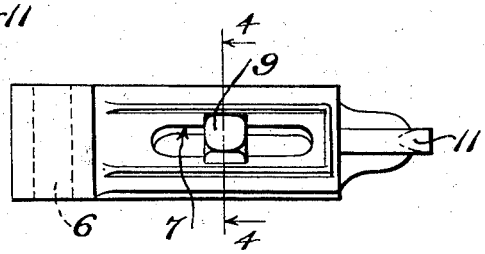
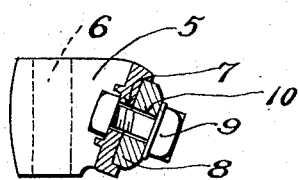
WITNESSES:
Charles H. Wagner
H. C. Robb
INVENTOR
J. H. Stubblefield
BY Robb
Robb
Attorneys

UNITED STATES PATENT OFFICE.

JOHN H. STUBBLEFIELD, OF SCOTTS HILL, TENNESSEE.

SPACING ATTACHMENT FOR CULTIVATORS OR PLOWS.

1,025,546.  Specification of Letters Patent.  Patented May 7, 1912.

Application filed August 26, 1911. Serial No. 646,259.

*To all whom it may concern:*

Be it known that I, JOHN H. STUBBLEFIELD, a citizen of the United States, residing at Scotts Hill, in the county of Henderson and State of Tennessee, have invented certain new and useful Improvements in Spacing Attachments for Cultivators or Plows, of which the following is a specification.

In the use of wheel supported cultivators and plows, or similar agricultural implements, it is at times a difficult matter to keep the earth agitating devices from cutting into the rows of plants or stalks operated upon, as for instance, in using the scraper attachments which are set at an angle that will cause them to close and cut into the rows of plants or stalks.

An object of this invention is to provide a simple and efficient attachment for these implements, securing the desired distance between the devices for agitating the earth, such as plows, or scraper attachments for cultivators, such distance being maintained against likelihood of closing, due to the character of mounting of the devices.

Another object of the invention is to provide an attachment possessing the above advantages, and at the same time permitting independent movement of either of the shovels or plows when passing over obstructions on either side of the row.

For a full understanding of the present invention, reference is to be had to the following description and to the accompanying drawings, in which—

Figure 1 is a view showing the attachment applied to a walking plow. Fig. 2 is a top plan view of the device. Fig. 3 is a front elevation. Fig. 4 is a section on the line 4—4 of Fig. 3.

Throughout the following detail description and on the several figures of the drawings, similar parts are referred to by like reference characters.

In the drawings, the invention is shown as attached to a double beam wheel supported plow, the beams 2 and 2' having the usual shovels or plows 3 and 3' secured to the lower ends of the standards 4 and 4', said beams being mounted on the frame for vertical and lateral movement in the ordinary manner in implements of this character and therefore the construction is not illustrated in the drawings. To one of said standards the device is attached while its opposite end is adapted to bear against, or limit the inward movement of the other standard beyond a desired point.

Describing the invention in detail, I provide an attaching arm 5 having at one end a socket 6 through which the standard 4' passes and the longitudinal slot 7 extending through the body portion thereof. The under surface of the attaching arm 5 is channeled to receive the extension arm 8 for sliding movement.

At 9 is indicated a clamping bolt which passes through the slot 7 and the opening 10 in the arm 8, a suitable number of said openings being provided to accommodate for various adjustments. At the outer extremity of and extending at substantially right angles to the extension arm 8 is formed the horizontal bearing arm 11, to provide for the lateral movement of the standards 4 and 4' should, for instance, one horse walk in advance of the other.

As will be readily apparent, the operation of the implement adjusts the extension arm 8 to provide the proper space for cultivating the row and said bearing arm 11 will prevent the closing of the space aforesaid.

Should it be desirable, the attachment permits the independent action of one or the other of the agitating devices so that they may pass over an obstruction without the necessity of raising both of the shovels.

I do not confine myself to the style of cultivators shown in the drawings, as the invention may be attached to several different styles and makes of cultivators.

Having thus described the invention, what is claimed as new is:

1. In a device of the class described, the combination of a wheel supported frame, beams, standards mounted on said beams, earth agitating devices secured to the standards, and means mounted on one of said standards and free with respect to the other for maintaining the desired distance between the standards aforesaid.

2. In a device of the class described, the combination of a wheel supported frame, beams, standards mounted on said beams, earth agitating devices secured to the standards, and adjustable means mounted on one of said standards and free with respect to the other for maintaining the desired distance between the standards aforesaid.

3. In a device of the class described, the combination of a wheel supported frame, beams pivotally mounted on said frame, standards mounted on the beams, earth agitating devices secured to the standards, and means for spacing the standards apart comprising an attaching arm mounted on one of the aforesaid standards, an extension arm slidably secured to the attaching arm, and a horizontal bearing arm formed on the extension arm and adapted to limit the inward movement of the earth agitating devices.

In testimony whereof I affix my signature in presence of two witnesses.

JOHN H. STUBBLEFIELD.

Witnesses:
J. W. PATTERSON,
C. S. WALTON.

Copies of this patent may be obtained for five cents each, by addressing the "Commissioner of Patents, Washington, D. C."